United States Patent
Melind

[11] 3,776,420
[45] Dec. 4, 1973

[54] TURRET TYPE FEEDER FOR SPRAY MACHINE
[75] Inventor: Julius J. Melind, Des Plaines, Ill.
[73] Assignee: H. L. Fisher Mfg. Co. Inc., Chicago, Ill.
[22] Filed: Apr. 3, 1972
[21] Appl. No.: 240,601

[52] U.S. Cl................. 221/211, 221/297, 198/103, 118/319
[51] Int. Cl................................................ B23q 7/04
[58] Field of Search........................... 198/105, 103; 221/211, 297; 118/319, 320, 372, 318

[56] References Cited
UNITED STATES PATENTS
| | | | |
|---|---|---|---|
| 3,591,047 | 7/1971 | Buhle | 221/211 |
| 1,667,483 | 4/1928 | Leof | 221/297 X |
| 2,855,113 | 10/1958 | Roske | 221/211 X |
| 2,600,138 | 6/1952 | Tesch, Jr. | 221/211 X |
| 1,602,686 | 10/1926 | Leet | 221/297 X |

Primary Examiner—Evon C. Blunk
Assistant Examiner—H. S. Lane
Attorney—John A. Dienner et al.

[57] ABSTRACT

In a turret type machine adapted to apply a coating to one surface of a can lid, the can lids are stacked in a load chute and sequentially advanced downwardly by a feed means that drops the lowermost can lid to a loading position. A turret subassembly rotates a plurality of radially extending work holder units in timed relation to the feed means such that a work holder unit passes through the loading position simultaneously with the arrival of the lid. Each work holder unit has a work piece holder at its outer end which catches the falling can lid and a suction means to hold the can lids in place as the work holder unit moves into a spraying area. After a conventional spraying device applies a coating to the can lid, the suction means releases its hold on the treated can lid and the can lid drops to an output chute.

13 Claims, 11 Drawing Figures

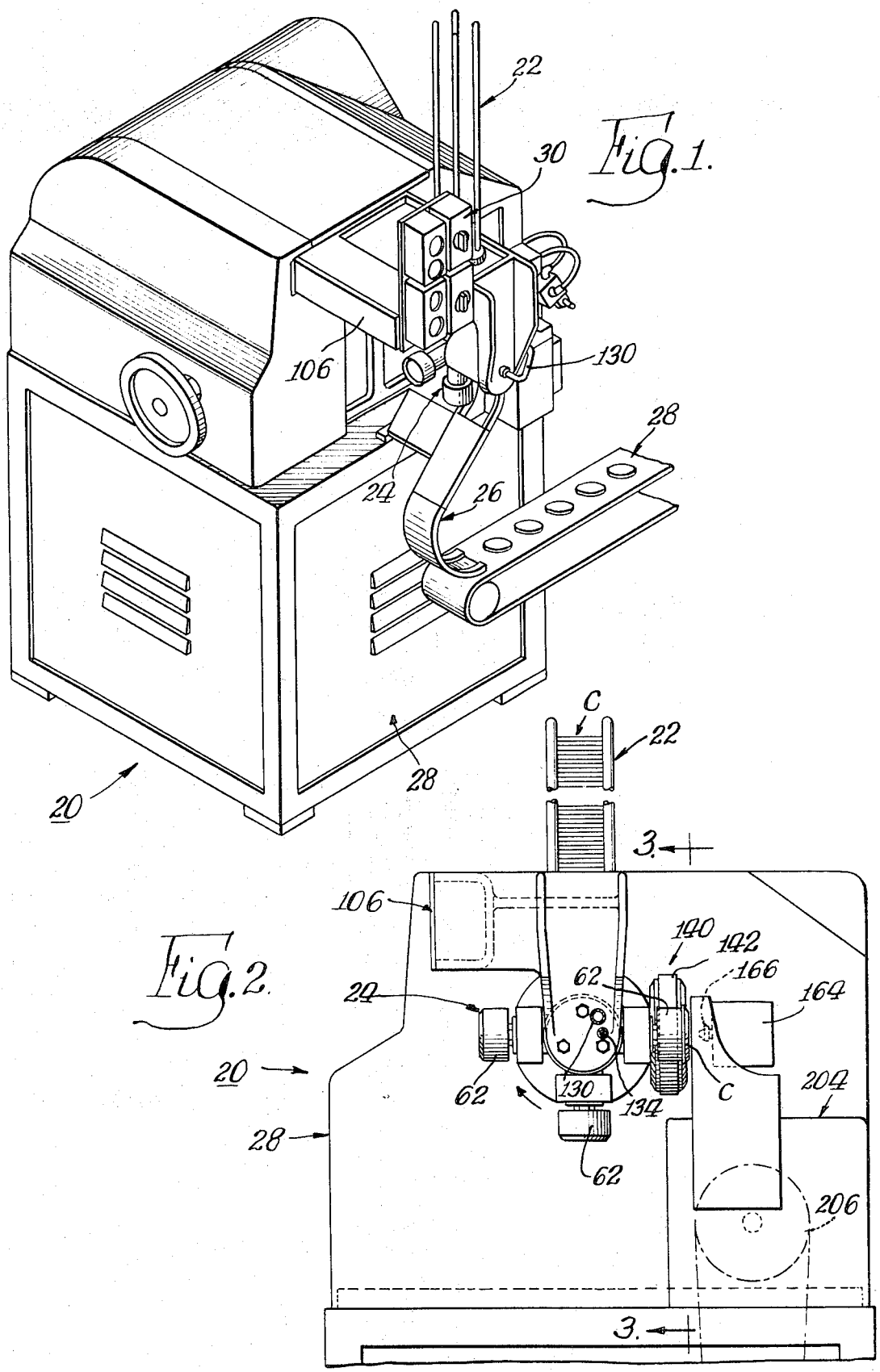

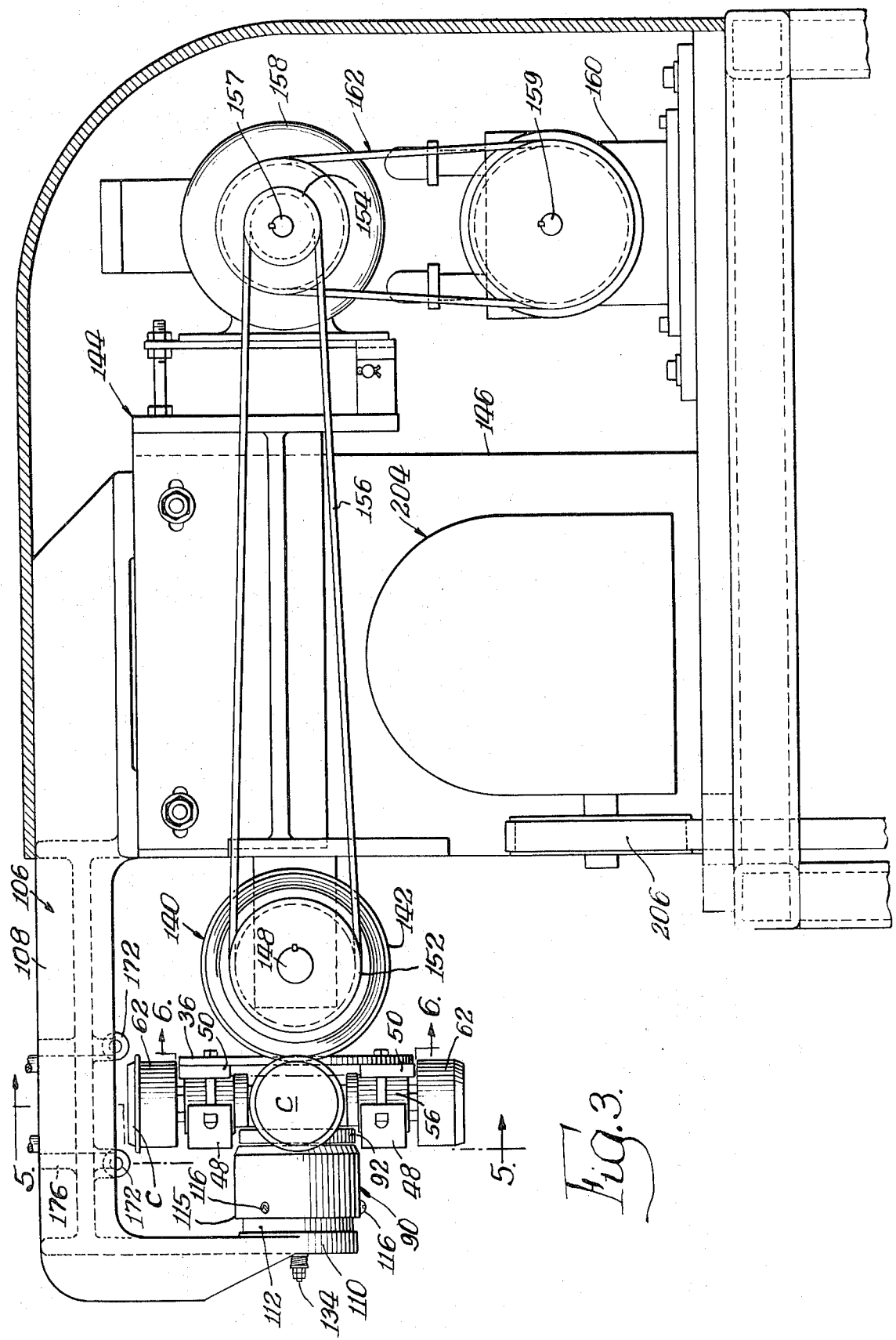

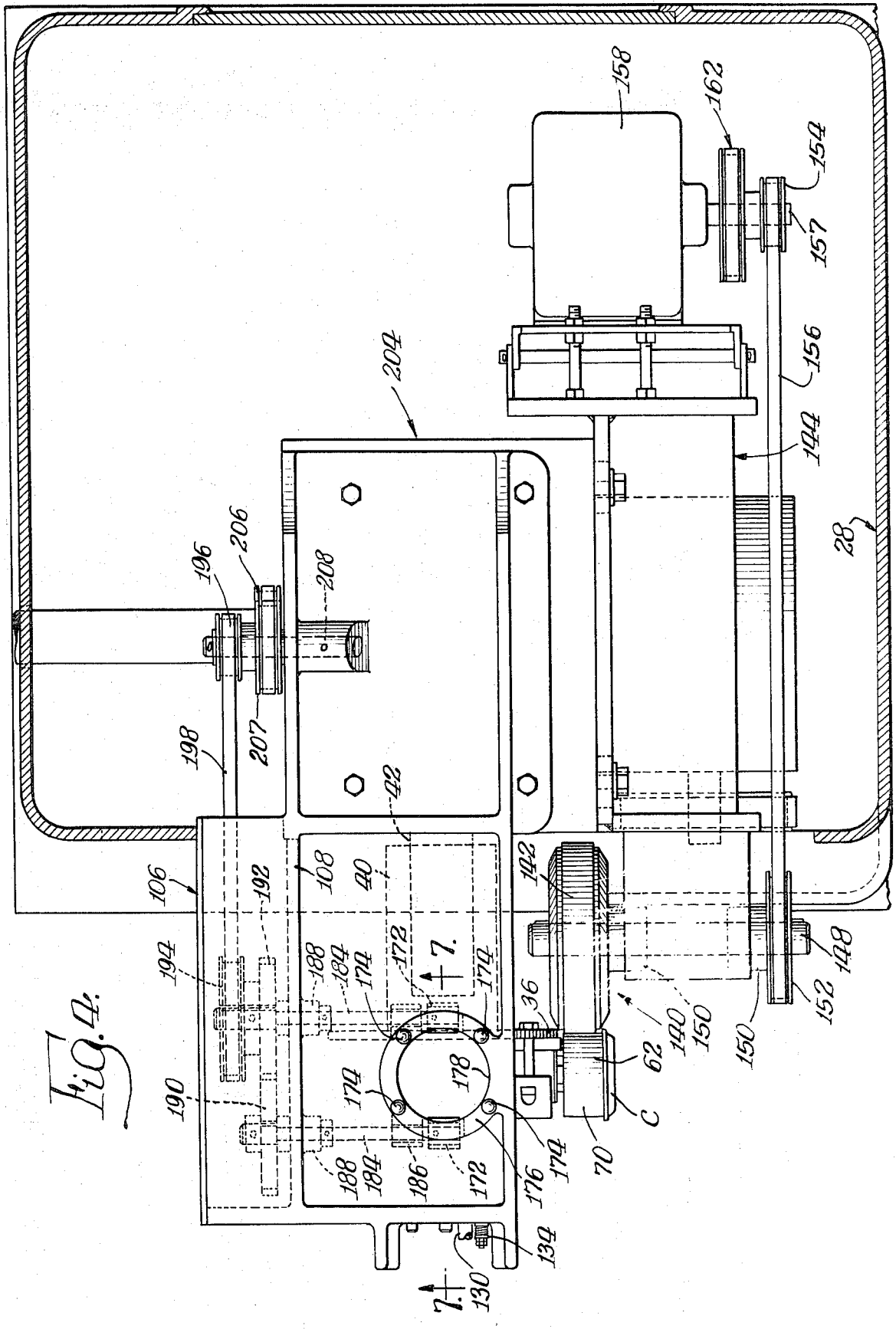

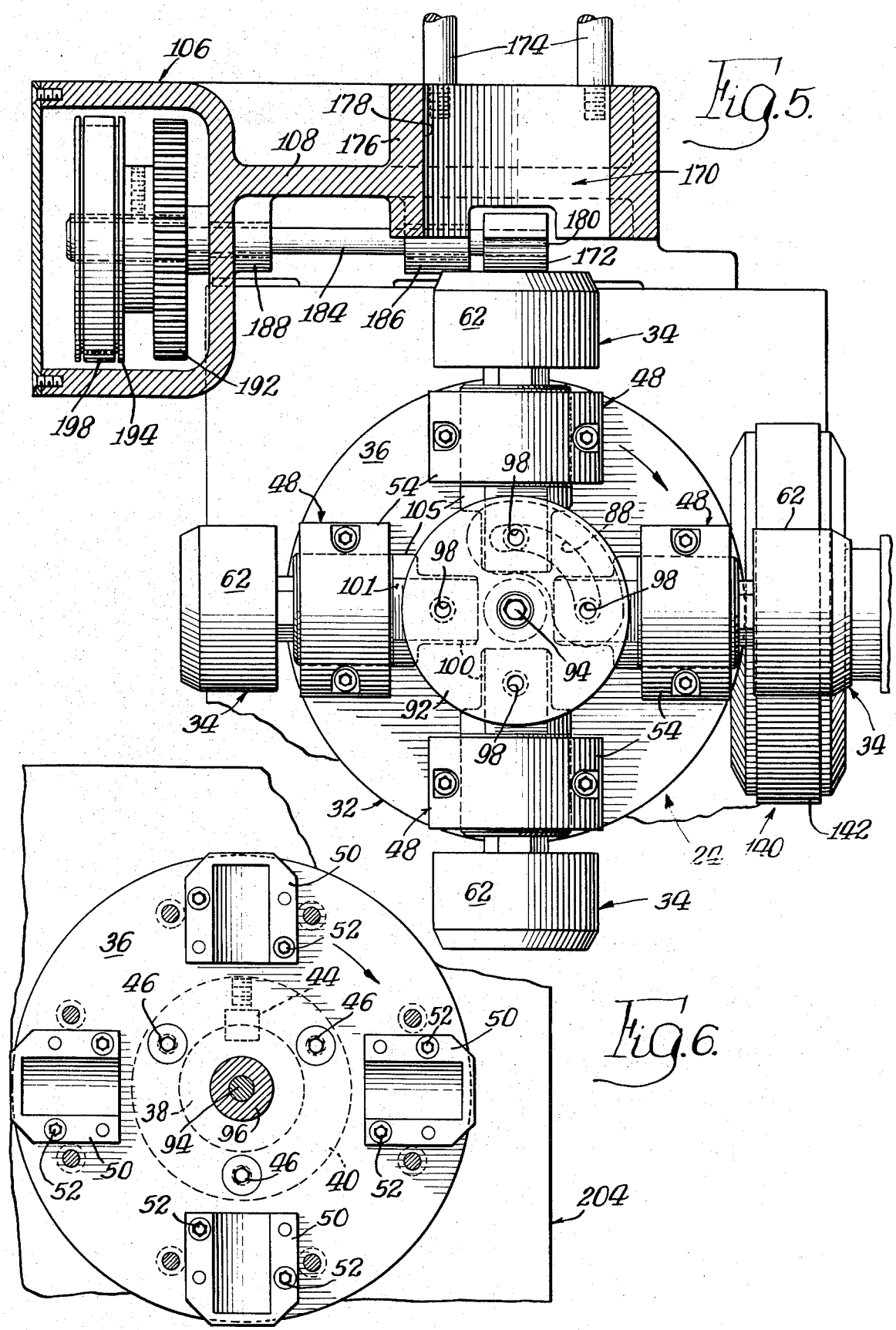

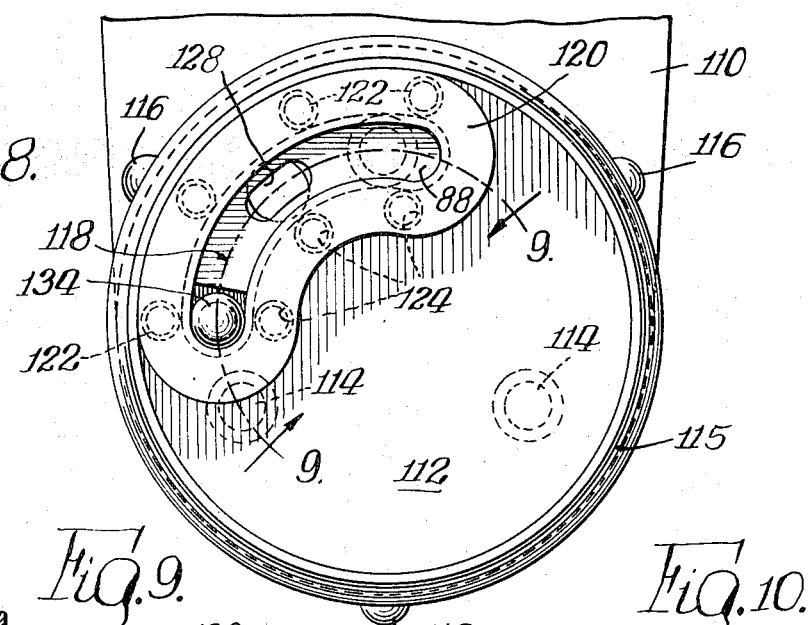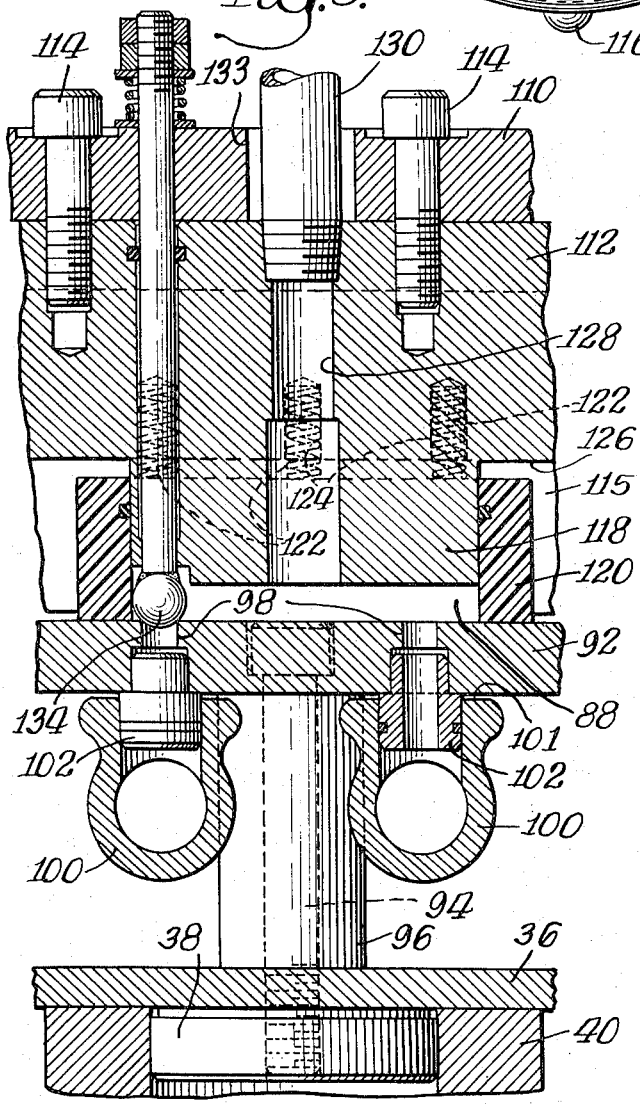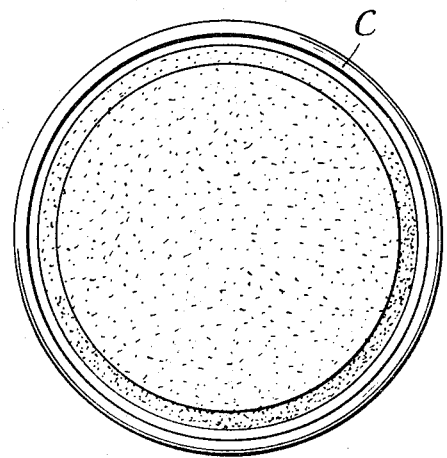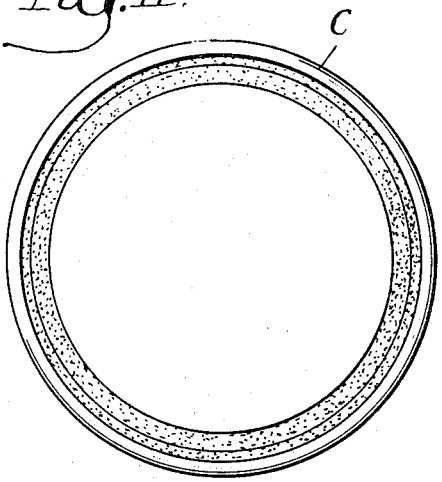

ained in accordance with the principles of this invention.

TURRET TYPE FEEDER FOR SPRAY MACHINE

BACKGROUND OF THE INVENTION

This invention relates to a turret-type machine for handling disc-shaped workpieces or the like. The invention in particular relates to a turret-type machine for carrying the disc-shaped workpieces to be operated upon to a work station and thereafter delivering the treated workpieces into an output chute. In the design of spraying machines for applying a coating to the inside surface of such disc-shaped objects as can lids, one of the major design problems is providing a means for picking up the disc-shaped workpieces and holding them during the spraying operation.

There are two major design criterias in designing any type of turret machine — one being the simplicity of the turret machine construction, and the other being the speed at which it operates. This invention satisfies both of the above mentioned design criterias for it embodies a very novel but simple construction which is easy to maintain and quite reliable in performance. However, its greatest advantage over the prior art is its speed capabilities as compared with prior art turret-type machines.

SUMMARY OF THE INVENTION

This invention is a turret-type apparatus used in a machine for applying a coating to one surface of a disc-shaped work piece and comprises speed means for sequentially advancing a plurality of the workpieces to cause the lowermost workpiece to drop to a loading position, where it is picked up by one of a plurality of work holder means which are carried by a turret means. The turret means is driven in a timed relation with respect to the feed means so that one of the work holder means passes through the loading position simultaneously with the arrival of the lowermost workpiece. Suction means are utilized for holding the workpieces onto the work holder means throughout the travel of the work holder means from the loading position to the spraying position and for releasing the workpiece after the coating operation is complete.

DESCRIPTION OF THE DRAWINGS

For a better understanding of this invention reference may be made to the accompanying drawings, in which:

FIG. 1 is a front perspective view of a turret-type machine embodying the principles of this invention;

FIG. 2 is a partial front view of FIG. 1 showing various operating components mounted inside the machine housing;

FIG. 3 is a cross-sectional view taken along the line 3—3 of FIG. 2 and looking in the direction of the arrows;

FIG. 4 is a top plan view of the inside of the turret-type machine embodying the principles of my invention;

FIG. 5 is a cross-sectional view taken along the line 5—5 of FIG. 3 and looking in the direction of the arrows;

FIG. 6 is a plan view of the circular mounting plate which carries the components of the turret subassembly;

FIG. 8 is a sectional view taken along the line 8—8 of FIG. 7 and looking in the direction of the arrows;

FIG. 9 is a cross-sectional view taken along the line 9—9 of FIG. 8 and looking in the direction of the arrows; and FIGS. 10 and 11 are illustrations of can lid coatings treated in accordance with the principles of this invention.

DESCRIPTION OF PREFERRED EMBODIMENT

Figure 7:
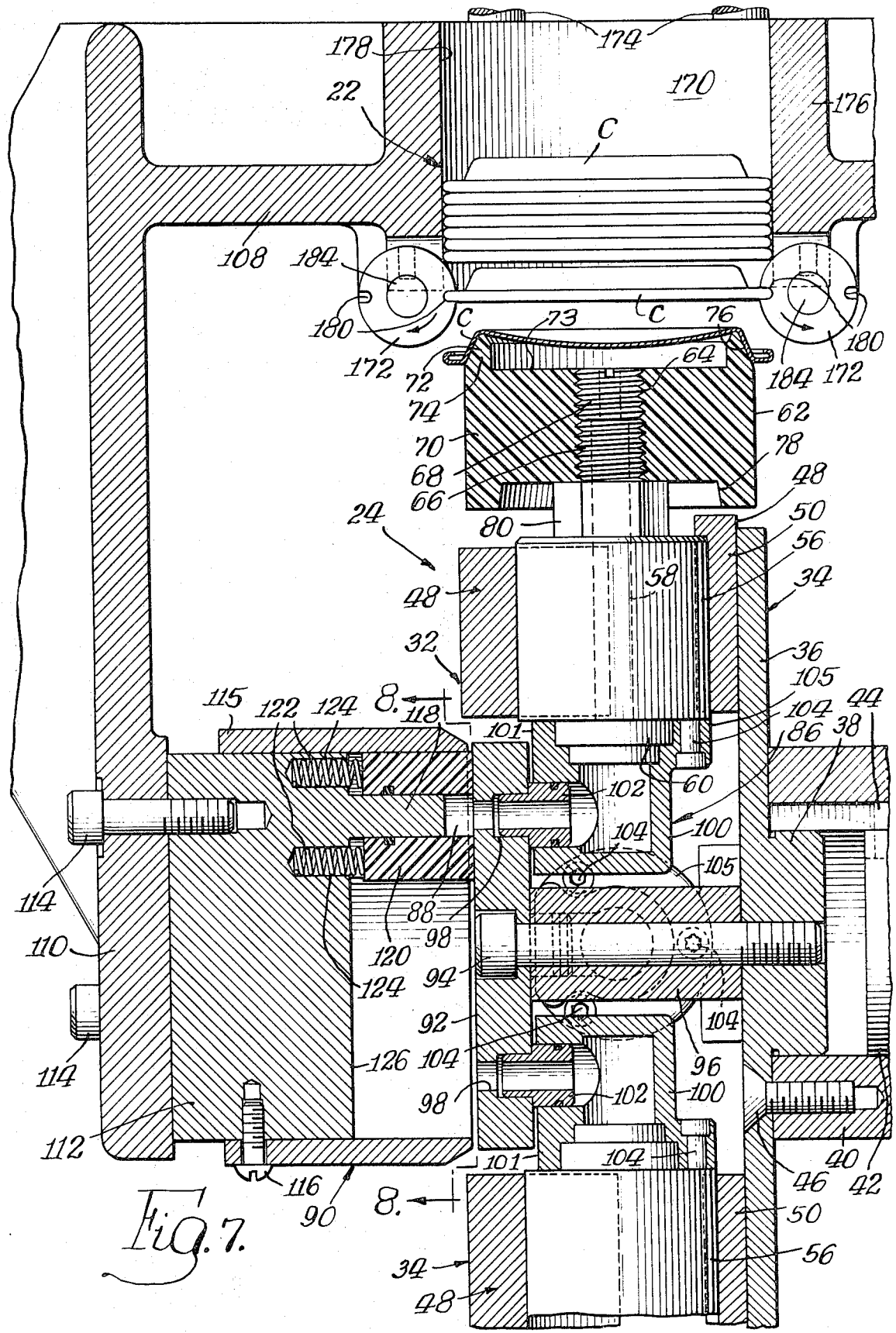
FIG. 7 is a cross-sectional view taken along the line 7—7 of FIG. 4 and looking in the direction of the arrows.

Referring to FIG. 1, there is shown a front perspective view of a can lid coating machine embodying the principles of this invention and generally designated by the reference numeral 20. The machine 20 is designed to automatically feed a stack of uncoated can lids from feed chute 22 to a can holder assembly 24 (FIG. 2) and the can holder assembly 24 moves the can lids into a spraying position and after the spraying operation is complete the can lids are dropped into output chute 26. The can lids exit from the output chute 26 and are picked up by a conveyor belt 28 (partially shown) where they may be delivered through curing ovens and/or given further treatment.

The various operating components for the spray machine 20 are contained inside housing 28. At the front of the machine there is located a control panel 30 which includes start and stop switches.

The holder assembly 24, as depicted in FIGS. 5 through 7, comprises a turret subassembly 32 having four identical workpiece holder units 34 mounted in an equally spaced radial arrangement (see FIG. 5) on a circular mounting plate 36 having a centrally located hub portion 38 (FIG. 7). A mounting sleeve 40 (FIG. 7) is provided to interconnect the turret subassembly 32 to a drive shaft 42. Keyed means 44 (FIGS. 6 and 7) fixedly secures the sleeve 40 to the drive shaft 42, and a plurality of mounting bolts 46 (three shown in FIG. 6) fasten the mounting plate 36 to the sleeve 40.

The workpiece holder units 34 are mounted on circular plate 36 by means of a saddle clamp 48, the lower half portion 50 of which is secured to the mounting plate 36 by means of bolts 52 (FIG. 6). The upper half portion 54 (FIG. 5) of saddle clamp 48 when mated with the lower set of portion 50 forms a locking collar about the circular body portion 56 of each workpiece holder unit 34. A hollow rotatable shaft 58 extends axially through the central body portion and is rotatably mounted by two bearings — one bearing 60 at its inner end and a second bearing (not shown) formed internally of the circular body portion 56. A workpiece holder 62 is fastened on the outer end of the rotatable shaft 58. To permit the interchange of different sized workpiece holder 62 to accommodate different diameter can lids, the four workpiece holders 62 are removably mounted on the outer end of the four rotatable shafts 58 by virtue of the threaded engagement between their threaded central bore 64 and a threaded piece 66 secured on the outer end of shaft 58. A threaded plug 68 is used to lock the workpiece holder 62 in place on the rotatable shaft 58.

The workpiece holder 62 has a circular body portion 70 that tapers inwardly at outer end 72. A circular recess 73 is formed in the tapered end 72 to present an annular ridge 74 that defines a seat for the can lid C (FIG. 7). As depicted in FIG. 7, the inwardly tapered outer surface 76 of annular rib 74 conforms to the shape of the flange portion of can lid C. The inner end of the workpiece holder 62 has an annular central recess 78, and when mounted on rotatable shaft 58 a spacer member 80 is disposed between this recess 78 and central body portion 56.

The function of the workpiece holder units 34 is to pick up a can lid C in the loading position of FIG. 7 and hold the can lid as the turret subassembly 32 carries the holder unit 34 and associated can lid to the spraying position where a commercially available spraying device applies a coating to the inner surface of the can lid.

Referring to FIG. 2, the workpiece holder units 34 pick up the can lids at the vertical loading position and carry them through an approximate 90 degree rotation in the clockwise direction to the spraying position where a commercial spraying device 84 applies a coating to the inside surface of the can lids. After the spraying operation is complete the can lids are dropped into the output chute 26 (FIG. 1). Between these two positions the can lids C are held on the workpiece holder 62 by virtue of a novel suction means 86, which will now be described.

The function of suction means 86 is to apply a vacuum to the can lid C seated on the tapered end 72 of the workpiece holder 62 through the hollow rotatable shaft 58 from a vacuum chamber 88 (FIGS. 8 and 9). Vacuum chamber 88 is formed by a stationary vacuum housing 90 and a revolvable wear plate 92 carried by the turret subassembly 32. Wear plate 92 has a circular configuration and is threadedly fastened to the circular mounting plate 36 by a mounting bolt 94. An elongated cylindrical spacer sleeve 96 separates the wear plate 92 from the circular mounting plate 36 and maintains the plates in a parallel relationship. Four stepped circular openings 98 provided in the wear disc plate 92 define a fluid passageway through the disc plate between the vacuum chamber 88 and the four hollow shafts 58. The four openings 98 are disposed in a concentric plane about the center of disc plate 92. A hollow bell-shaped housing 100 is provided at the inner end of each of the four holder units 34, and a valve member 102 couples the bell-shaped housing 100 and one of the four openings 98 to complete the fluid path between the workpiece receiving recess 73 and the vacuum chamber 88. Bell-shaped housing 100 has a generally bell-shaped configuration except that the side 101 facing the wear disc plate 92 is flattened. Bell-shaped housing 100 is secured to the circular body portion 56 by means of three spaced mounting bolts 104 (FIG. 7), which are inserted through the base portion 105 of the housing 100.

Vacuum housing 90 is supported from a projecting frame member 106 as depicted in FIG. 3 extending forwardly from the top of the machine housing 28. Frame member 106 has a horizontal leg 108 and a vertical leg 110. The vacuum housing 90 is assembled at the lower end of the vertical leg 110. Vacuum housing 90 includes a base block member 112 fastened to the vertical frame leg 110 by means of a plurality of mounting bolts 115. A cylindrical housing guard 114 is secured to the base block 112 by means of screws 116. An arcuate member 118 is integrally formed forwardly of the base block 112, and a wear shoe member 120 is floatingly supported on this arcuate member (FIGS. 7–9). This wear shoe 120 is made of a low friction material such as nylon, and has an arcuate closed loop configuration. Wear shoe 120 is urged against wear plate 92 by means of a plurality of springs 122, which are contained within openings 124 formed in the forward face 126 of the base frame member in spaced relation about both sides of arcuate member 118. Wear shoe 120 frictionally engages the disc plate 92 and together with the arcuate member 118 defines the vacuum chamber 88. The vacuum chamber 88 is connected to a vacuum source through an opening 128 (FIG. 8) extending through the base block 112 and arcuate member 118. The rearward end of opening 128 is in communication with a hose fitting 130 extending through an opening 132 in the vertical frame leg 110.

As clearly depicted in FIGS. 5 and 8, the length of the arcuate vacuum chamber 88 is somewhat longer than the arcuate distance between adjacent vacuum openings 98. At the end of the vacuum chamber 88 adjacent to the spraying station, a spring loaded ball valve 134 (FIG. 9) is provided in frictional engagement against the wear plate 92 and serves to shut off the opening 98 of each workpiece holder unit 34 upon reaching this location. The purpose of the ball valve 134 is to instantaneously terminate suction force applied to the can lid whose inside surface has just been sprayed at the coating station so that the can lid will drop by gravity into the output chute 26 (FIG. 1). It will be appreciated by referring to FIG. 8 that the loading end of the vacuum chamber 88 extends slightly beyond the vertical loading position in order that a vacuum is present upon each workpiece holder reaching the upright loading position.

During the spraying operation, a spinner means 140 is provided for constantly turning the work piece holder 62 and associated can lid C to ensure that a uniform coating will be applied across the inner surface of the can lid. Spinner means 140 comprises a spinner wheel 142 (FIGS. 3–4) which is disposed in the path of the workpiece holder 62 so that its outer peripheral surface is frictionally engaged by the body portion 70 of the workpiece holder 62 upon the workpiece holder 62 entering the spraying area. The spinner wheel 142 rotates the workpiece holder 62 and associated can lid on its rotatable shaft 58 throughout the spraying operation. The spinner wheel is supported at the forward end of a supporting bracket 144 which is mounted on an upright frame member 146 inside the machine housing 28 (FIG. 3). The spinner wheel is fixed to a rotatable shaft 148 which is rotatably mounted through a pair of spaced bearings means 150 on the forward end of the spinner bracket 144. A driven pulley 152 is fixed to the other end of shaft 148. The driven pulley 152 is coupled to a drive pulley 154 by means of an endless belt 156, and drive pulley 154 is keyed on the drive shaft 157 of electric motor 158. Motor 158 also serves as the power source for a vacuum pump 160 which provides the vacuum in chamber 88 through hose 130 (FIG. 9). Vacuum pump 160 is coupled to electric motor 158 by virtue of the pulley arrangement 162 coupling the output shaft 157 of the electric motor and the input shaft 159 of the vacuum pump (FIGS. 3 and 4).

The spraying device which is diagrammatically illustrated in FIG. 2 as block 164 having a spray nozzle 166 forms no part of this invention and is depicted only to fully describe the preferred embodiment of this invention. The spray device 164 could be any of a number of commercially available units such as the Nordson Model No. 25 Airless Spray Pump.

Referring to FIGS. 4, 5 and 7, there is illustrated a feed means for sequentially advancing a stack of workpieces (illustrated as can lids C) to the load position where one of the rotating workpiece holder units 34 picks up the can lid as depicted in FIG. 7. The feed means 170 comprises a feed chute 22 in which a plurality of can lids C are stacked in a vertical arrangement and a pair of feed rollers 172 are driven in timed relation with respect to the turret subassembly 32.

Feed chute 22 is made up of four upstanding spaced posts 174 which are mounted around the peripheral upper end of a cylindrical housing 176 in equal spaced relationship. As shown in FIG. 7, the can lids C are disposed vertically along the cylindrical bore 178 of the cylindrical housing 176. The pair of feed rollers 172 have a generally cylindrical shape and are provided with two diametrically opposite notches 180 formed in their peripheral surfaces. The feed rollers 172 are driven in unison so that the feed notches match up to engage the diagonally opposite edges of the lowermost can lid and advance this lid downwardly where it is released and drops a very short distance before being caught by the workpiece holder 62.

Feed rollers 172 are fixed to a pair of parallel shafts 184, each of which is rotatably mounted by a pair of bearing means 186 and 188 (FIG. 5), and a pair of intermeshing toothed gears 190 and 192 (FIG. 4) are secured to the rearward ends of the pair of parallel shafts 184. Fixedly secured behind tooth gear 192 is a pulley 194 which is driven by a drive pulley 196 through an inner-connecting endless belt 198.

To ensure that the turret subassembly 32 and the feed assembly are driven in a predetermined time relation, both assemblies are driven from a common power source. This power source is provided by a conventional speed reducer unit 204 (FIGS. 3–4) which is driven through pulley 206 by an electric motor (not shown) that is located in the bottom portion of housing 28. The output shaft of the speed reducer (in the order of a 5 to 1 gear ratio) drives pulley 207 (FIG. 4) which is keyed on idler shaft 208 and the driven pulley 207 in turn drives the pair of tooth gears 191, 192 through the pulley arrangement formed by pulleys 194, 196 and endless belt 198. This same gear reducer unit 204 drives the output shaft 42 (FIG. 7) which turns the turret subassembly 32.

In the operation of the turret-type spray machine 20, the can lids to be coated are fed into the load chute 22 as illustrated in FIG. 7, and the main drive motor (not shown) for speed reducer 204 and electric motor 158 are both energized. The energization of electric motor 158 (FIG. 3) operates the vacuum pump 160 to create a vacuum in chamber 88, and constantly drives the spinner wheel 142. The energization of the main drive motor starts the rotation of the turret subassembly 32 and the drive for feed means 170. Also, the spray system timing circuit is energized so that the spray device 164 will be ready to automatically apply a coating to the can lids as they pass directly in front of the spray nozzle 166. The spray system timing circuit has not been described since it forms no part of this invention and is not necessary for a complete understanding of the invention. One commercially available spray timing system that could be used with the above mentioned Nordson spraying device is a Nordson C-2 solid state timer system. In use with the preferred embodiment, the timing system for the spraying device 164 would be designed to energize the spraying device 164 as each of the workpiece holder unigs 34 pass directly across its path.

It should be understood that my invention is not limited to can lid spraying machines but is applicable to various other machines for disc workpieces to move the same to a work station where an operation is performed thereon, particularly where it is desired to operate on at least four workpieces simultaneously. Thus, while I have illustrated my invention in a preferred form, I do not intend to be limited to that form, except insofar as the appended claims are so limited, since modifications coming within the scope of my invention will be readily suggested to others with my disclosure before them.

I claim:

1. In a machine adapted to apply a coating to one surface of a disc-shaped workpiece, a turret apparatus for feeding and holding the workpieces comprising feed means for sequentially advancing a plurality of workpieces to a loading position, a plurality of work holder means each including a workpiece holder having its own axis of rotation, turret means for rotating said work holder means as a group in a timed relation with said feed means such that one of said workpiece holders passes said loading position simultaneously with the arrival of each workpiece, suction means for latching the workpieces onto said workpiece holder at said loading position and for releasing said workpiece after the coating operation terminates, and means for continuously turning said workpiece holder on its axis of rotation during said coating operation.

2. The combination of claim 1, wherein said feed means comprises a feed chute passageway extending upwardly and conforming to the shape of the disc workpieces and a pair of feed rollers disposed below the lower end of said passageway at diagonally opposite positions, and drive means for turning said feed rollers in unison in opposite directions, said feed rollers spaced apart at a distance less than the diameter of said disc workpieces and each having at least one notch formed in their peripheral surface which are matched together to simultaneously receive the outer peripheral portion of the lowermost workpieces and advance said lowermost workpiece to said loading position.

3. The combination of claim 1, wherein said turret means comprises a circular mounting plate, a drive shaft, coupler means for fixedly securing said mounting plate on said drive shaft and power means for turning said drive shaft and said mounting plate in timed relation with said feed means such that one of said workpiece holders passes said loading position simultaneously with the arrival of each workpiece.

4. The combination of claim 3, wherein said plurality of work holder means comprises a plurality of work holder units supported radially in equal spaced relation on said mounting plate, each of said work holder units including a central body portion, a hollow rotatable shaft extending radially through said central body portion, and said workpiece holder secured on the outer end of said shaft, the outer end of said workpiece holder conforming to the shape of the disc-shaped workpiece and wherein said suction means applies a vacuum force to the inner surface of said disc-shaped workpiece.

5. The combination of claim 4, further comprising threaded means for fastening said workpiece holder on said outer end of said hollow shaft to permit the interchange of different sized workpiece holders.

6. The combination of claim 4, wherein said suction means comprises a wear disc plate supported axially on said mounting plate and having a plurality of openings in equal spaced relation on a concentric plane, coupler means interconnecting pairs of said hollow shafts and said openings to define a fluid passageway therebetween, an arcuate member disposed adjacent the forward face of said wear plate and extending in the path of said concentric plane, an arcuate wear shoe conforming to the cross-sectional shape of said arcuate member, spring means for urging said wear shoe against said forward face of said wear plate to define a vacuum chamber, and vacuum source means for providing a constant vacuum in said vacuum chamber.

7. In a machine adapted to apply a coating to one surface of a disc-shaped workpiece, a turret apparatus for feeding and holding the workpieces comprising feed means for sequentially advancing a plurality of workpieces to a loading position, a plurality of work holder units having a central body portion, a hollow shaft rotatably supported by said central body portion, and a workpiece holder secured on the outer end of said hollow shaft, said workpiece holder comprising a cylindrical shaped body portion and an inwardly tapered outer end, a central recess provided in said outer end to present an annular ridge for seating the disc-shaped workpieces, and threaded means for removably securing said workpiece holder on said outer end of said shaft, said threaded means including an axial bore in communication with said hollow shaft, turret means for rotating said work holder units disposed in a radial equal spaced arrangement in a timed relation with said feed means such that one of said workpiece holders passes said loading position simultaneously with the arrival of each workpiece, suction means for latching the workpieces onto said workpiece holder at said loading position and for releasing said workpiece after the coating operation terminates, said suction means comprising a wear disc plate supported axially by said turret means and having a plurality of openings in equal spaced relation on a concentric plane, coupler means interconnecting pairs of said hollow shaft and said openings to define a fluid passageway therebetween, an arcuate member disposed adjacent the forward face of said wear plate and extending in the path of said concentric plane, an arcuate wear shoe conforming to the cross-sectional shape of said arcuate member, spring means for urging said wear shoe against said forward face of said wear plate to define a vacuum chamber, vacuum source means for providing a constant vacuum in said vacuum chamber, and a spring loaded ball valve located at one end of said vacuum chamber and adapted to close off one of said openings in said wear plate to terminate the vacuum force applied to the workpiece after the coating operation is complete.

8. In a machine adapted to apply a coating to one surface of a disc-shaped workpiece, a turret apparatus for feeding and holding the workpiece comprising feed means for sequentially advancing a plurality of workpieces to a loading position, a plurality of work holder units having a central body portion, a hollow shaft rotatably supported by said central body portion, and a workpiece holder secured on the outer end of said hollow shaft, turret means for rotating said work holder units disposed in a radial equal spaced arrangement in a timed relation with said feed means such that one of said workpiece holders passes said loading position simultaneously with the arrival of each workpiece, suction means for latching the workpieces onto said workpiece holder at said loading position and for releasing said workpiece after the coating operation terminates, and spinner means for continuously turning said workpiece holder on the axis of said shaft during said coating operation.

9. The combination of claim 9, wherein said feed means comprises a feed chute passageway extending upwardly and conforming to the shape of the disc workpieces and a pair of feed rollers disposed below the lower end of said passageway at diagonally opposite positions, and drive means for turning said feed rollers in unison in opposite directions, said feed rollers spaced apart at a distance less than the diameter of said disc workpieces and each having at least one notch formed in their peripheral surface which are matched together to simultaneously receive the outer peripheral portion of the lowermost workpieces and advance said lowermost workpiece to said loading position.

10. The combination of claim 8, wherein said spinner means comprises a spinner wheel disposed in the path of said workpiece holders and engaging said cylindrical body portion during the period of said coating operation, and spinner drive means for constantly turning said spinner wheel.

11. The combination of claim 8, wherein said turret means comprises a circular mounting plate, a drive shaft, coupler means for fixedly securing said mounting plate on said drive shaft and power means for turning said drive shaft and said mounting plate in timed relation with said feed means such that one of said work holder units passes said loading position simultaneously with the arrival of each workpiece.

12. The combination of claim 8, wherein said workpiece holder comprises a cylindrical shaped body portion and an inwardly tapered outer end, a central recess provided in said outer end to present an annular ridge for seating the disc-shaped workpieces, and threaded means for removably securing said workpiece holder on said outer end of said shaft, said threaded means including an axial bore in communication with said hollow shaft.

13. The combination of claim 12, wherein said suction means comprises a wear disc plate supported axially by said turret means and having a plurality of openings in equal spaced relation on a concentric plane, coupler means interconnecting pairs of said hollow shaft and said openings to define a fluid passageway therebetween, an arcuate member disposed adjacent the forward face of said wear plate and extending in the path of said concentric plane, an arcuate wear shoe conforming to the cross-sectional shape of said arcuate member, spring means for urging said wear shoe against said forward face of said wear plate to define a vacuum chamber, and vacuum source means for providing a constant vacuum in said vacuum chamber.

* * * * *

PO-1050
(5/69)

UNITED STATES PATENT OFFICE
CERTIFICATE OF CORRECTION

Patent No. 3,776,420      Dated December 4, 1973

Inventor(s) Julius J. Melind

It is certified that error appears in the above-identified patent and that said Letters Patent are hereby corrected as shown below:

Column 8, line 11, change "claim 9" to --claim 8--.

Signed and sealed this 16th day of April 1974.

(SEAL)
Attest:

EDWARD M. FLETCHER, JR.
Attesting Officer

C. MARSHALL DANN
Commissioner of Patents